July 17, 1928.
C. O. HAASE
1,677,135
STRAND WORKING MECHANISM
Filed Dec. 20, 1924    4 Sheets-Sheet 1
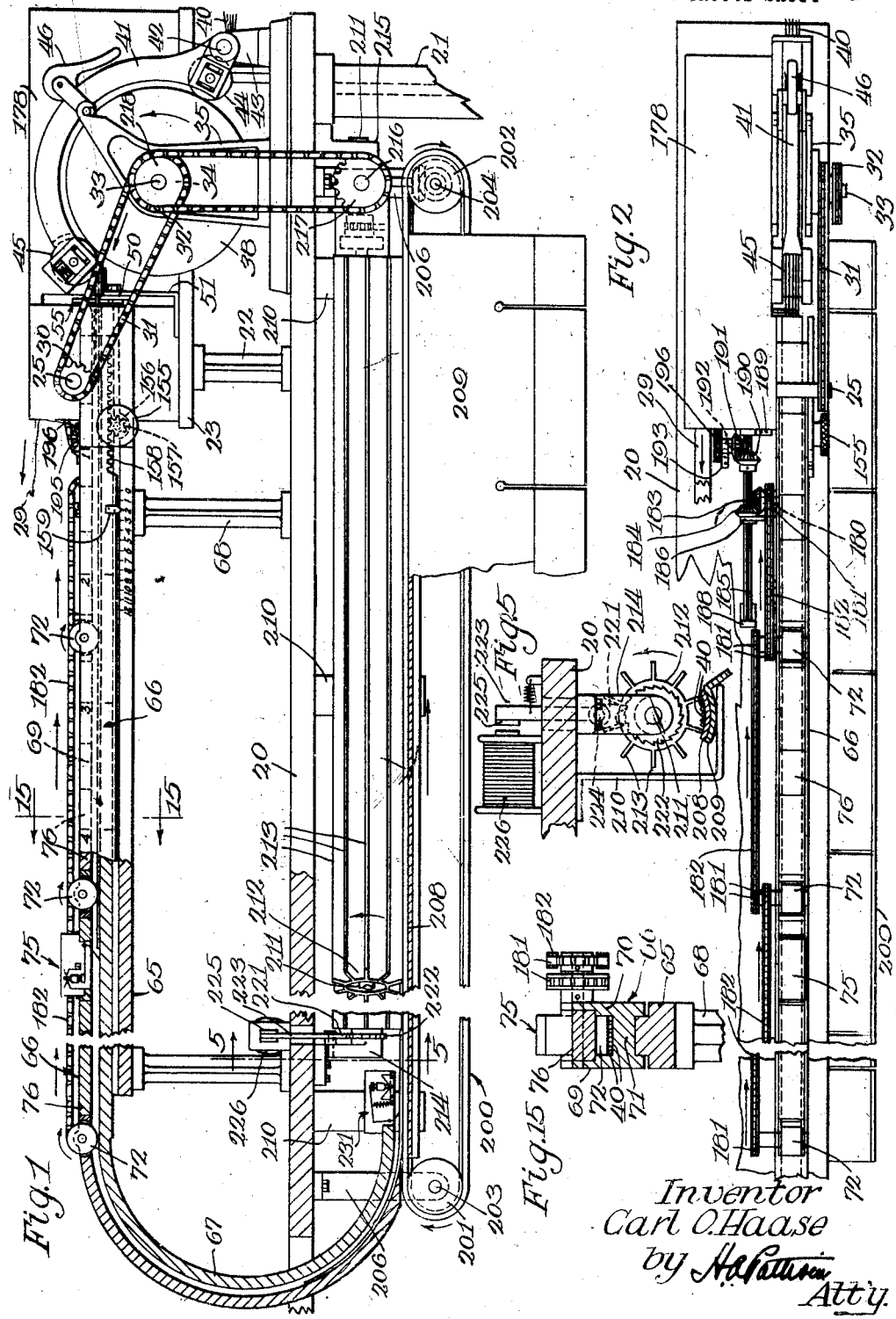
Inventor
Carl O. Haase
by H.C. Patterson
Atty.

July 17, 1928.
C. O. HAASE
1,677,135
STRAND WORKING MECHANISM
Filed Dec. 20, 1924
4 Sheets-Sheet 2
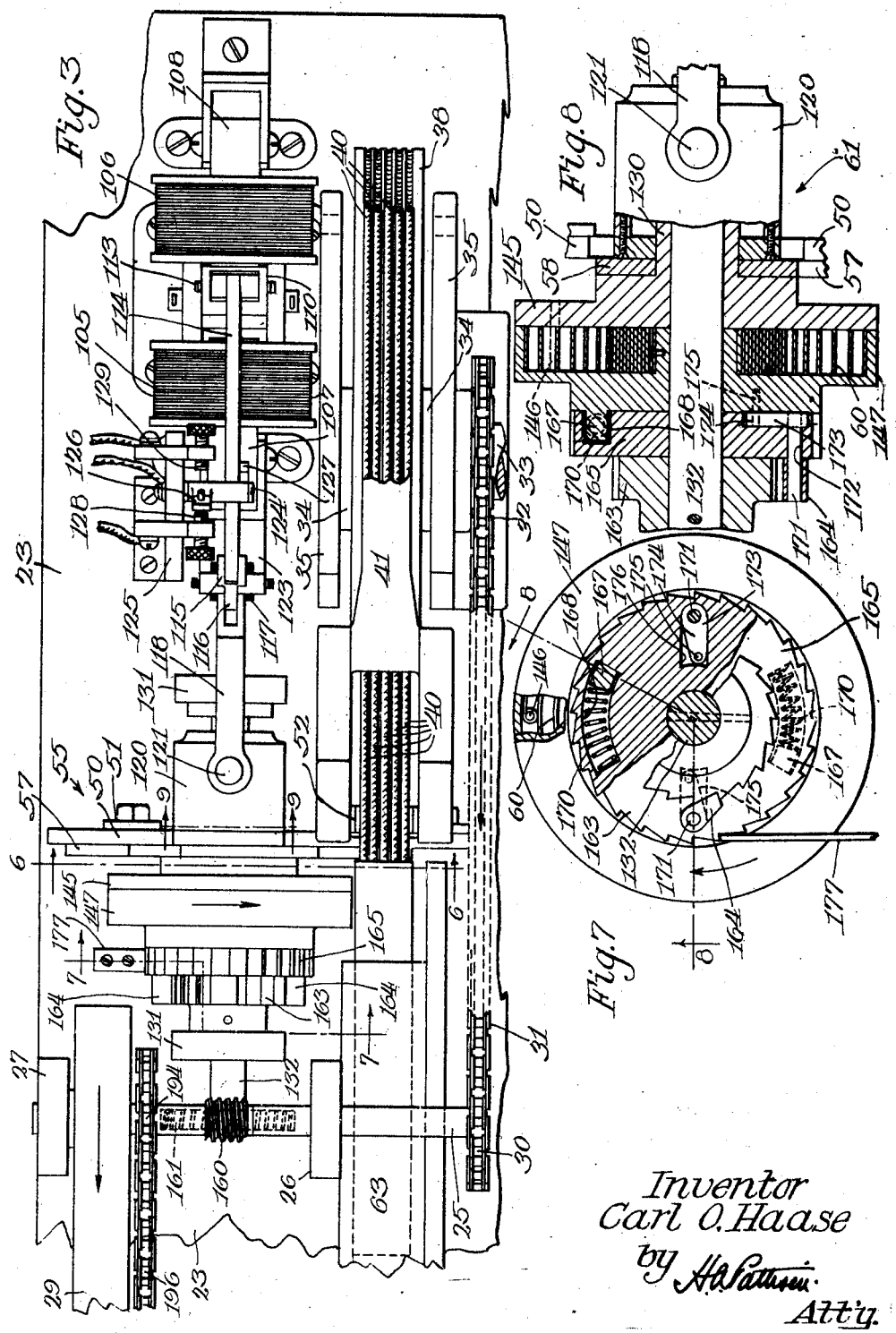
Inventor
Carl O. Haase
by H. A. Patterson
Att'y.

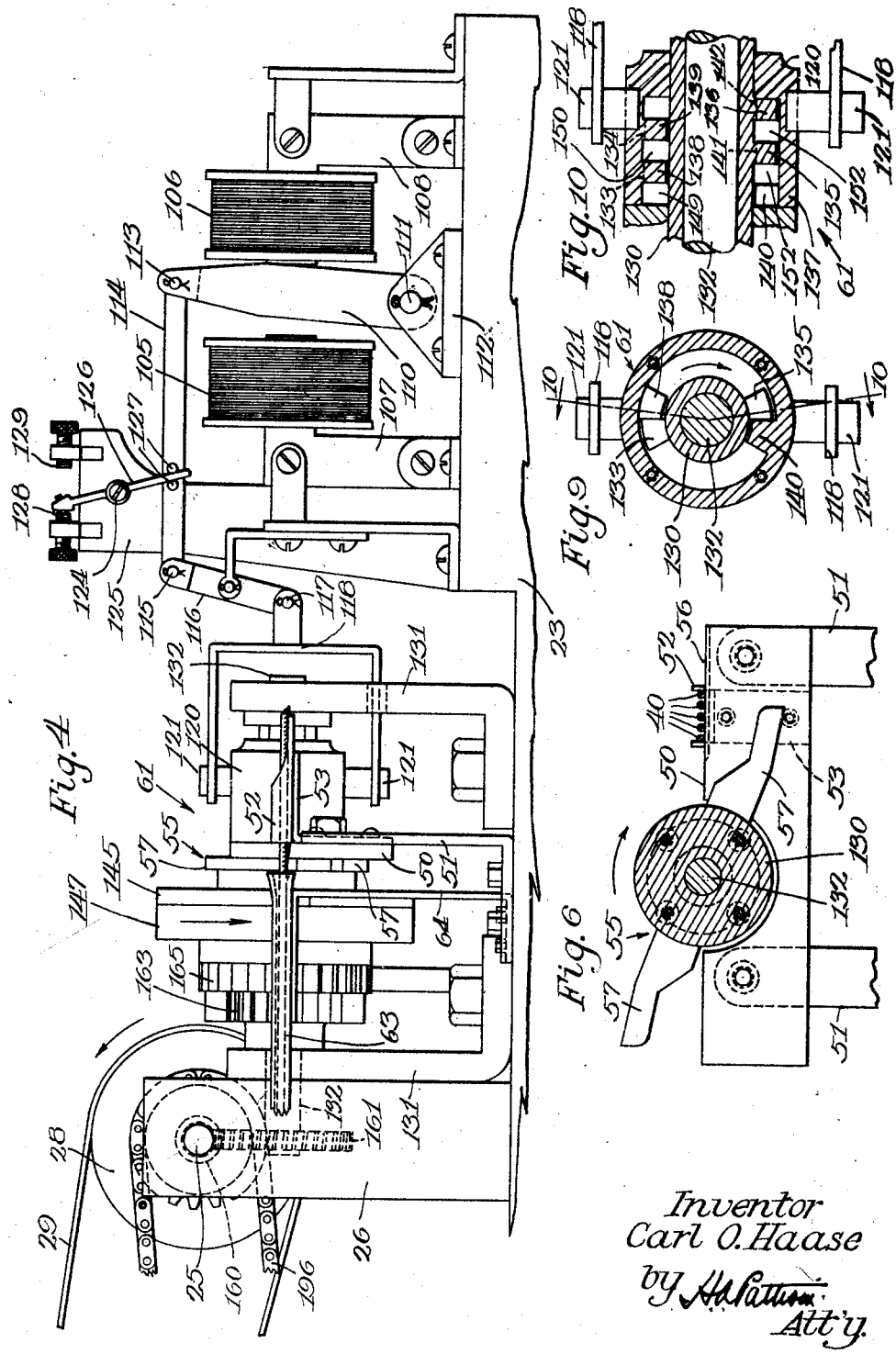

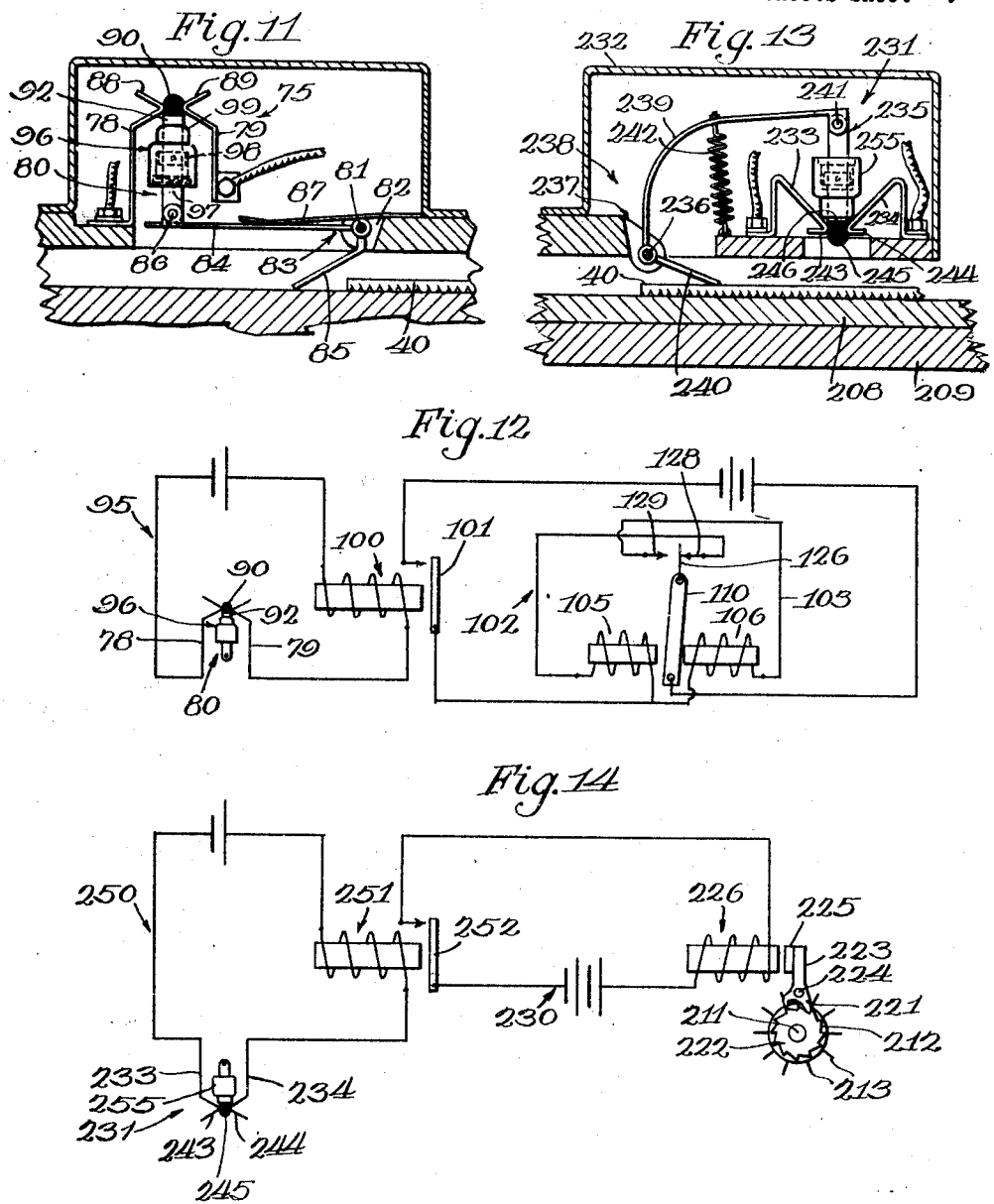
July 17, 1928.
C. O. HAASE
1,677,135
STRAND WORKING MECHANISM
Filed Dec. 20, 1924
4 Sheets-Sheet 4
Inventor
Carl O. Haase
by
H. A. Pattison
Atty.

Patented July 17, 1928.

1,677,135

UNITED STATES PATENT OFFICE.

CARL ODENWALD HAASE, OF WINNETKA, ILLINOIS, ASSIGNOR TO WESTERN ELECTRIC COMPANY, INCORPORATED, OF NEW YORK, N. Y., A CORPORATION OF NEW YORK.

STRAND-WORKING MECHANISM.

Application filed December 20, 1924. Serial No. 757,283.

This invention relates to strand working mechanisms, and more particularly to an apparatus for serving a strand into predetermined lengths.

The primary object of this invention is to provide an improved apparatus for severing a strand into predetermined lengths.

Other objects and advantages will become apparent in the following detail description, and the novel features of the invention will be pointed out in the appended claims.

In accordance with the general features of the invention, there is provided a grooved table or runway along which a plurality of strands, such as wires or cords, are simultaneously moved by a plurality of positively driven rollers. Upon the forward ends of the strands engaging an electrical contact member adjustably positioned along the runway, one of a plurality of electromagnets is actuated, thereby operating a spring actuated revolvable cutter to sever the strands. Mechanism is provided for restoring the energy dissipated during each operation of the cutter. The severed strands are pushed around a semi-circular portion of the runway and onto a moving belt until they clear an electrical contact member which actuates mechanism for indexing a revolvable drum to eject the strands into a suitable container wherein they may be tied together in bunches of any desired size or number. The length of the runway may be changed to vary the length of the severed strands.

Although the invention is herein illustrated and described in connection with an apparatus for simultaneously cutting into predetermined lengths a plurality of electrical conductors employed in the manufacture of telephone cords, it should be understood that the novel features and advantages are capable of other applications and that the invention is to be limited only by the general scope of the appended claims.

In the accompanying drawings which illustrate one specific embodiment of the invention:

Fig. 1 is a fragmentary front elevation, partly in section, of a cord cutting apparatus embodying the features of the present invention;

Fig. 2 is a fragmentary plan view of the mechanism shown in Fig. 1;

Fig. 3 is an enlarged plan view of a portion of the mechanism shown in Fig. 1 with the cover inclosing the spring actuated cutting mechanism removed;

Fig. 4 is a fragmentary front elevation of the mechanism shown in Fig. 3 with the capstan and associated mechanism omitted in order to more clearly show the mechanism for actuating the cutting apparatus;

Fig. 5 is a fragmentary detail sectional view taken on the line 5—5 of Fig. 1 showing the mechanism for indexing the ejecting drum;

Fig. 6 is a fragmentary sectional view taken on the line 6—6 of Fig. 3 and looking in the direction indicated by the arrows;

Fig. 7 is an enlarged fragmentary sectional view taken on the line 7—7 of Fig. 3;

Fig. 8 is a fragmentary detail sectional view taken on the line 8—8 of Fig. 7;

Fig. 9 is an enlarged fragmentary sectional view taken on the line 9—9 of Fig. 3;

Fig. 10 is a fragmentary detail sectional view taken on the line 10—10 of Fig. 9;

Fig. 11 is an enlarged fragmentary section of the electrical contact member for opening and closing the electrical circuit which controls the operation of the cutting mechanism;

Fig. 12 shows the electrical circuit for controlling the operation of the cutting mechanism;

Fig. 13 is an enlarged fragmentary section of the electrical contact member for closing and opening the circuit which controls the indexing of the ejecting drum;

Fig. 14 shows the electrical circuit which controls the indexing of the ejecting drum; and Fig. 15 is an enlarged fragmentary section taken on the line 15—15 of Fig. 1.

Referring now to the drawings in detail wherein like reference characters designate like parts throughout the several views, 20 denotes a bench which is suitably supported upon and secured to upright standards 21, 21. Positioned near one end and supported upon the top of the bench 20 by standards 22, 22 is a supporting platform 23 (Fig. 1). A main driving shaft 25 is journaled in bearings 26 and 27 (Figs. 3 and 4), which bearings are suitably secured to the platform 23. The shaft 25 is driven by a pulley 28 and a belt 29 from any suitable source of power (not shown).

Keyed at one end of the shaft 25 is a sprocket 30 which cooperates with a sprocket chain 31 and a sprocket 32 to drive a shaft 33. The shaft 33 is journaled in suitable bearings 34, 34 supported by standards 35, 35 which are suitably secured to the bench 20. A capstan 38 is splined on the shaft 33 and is adapted to withdraw a plurality of cords or other strands 40 (Figs. 1 and 3) from a plurality of supply sources (not shown). Circumscribing approximately one-half of the periphery of the capstan 38 is an arcuate cover 41 which is hinged at 42 to a bracket 43 secured to the bench 20. A grooved roller 44 is revolvably mounted at the hinged end of the cover 41, which cover carries at its free end a second grooved roller 45. A cam locking mechanism 46 (Fig. 1) is provided for urging the rollers 44 and 45 against the periphery of the capstan 38.

Upon leaving the roller 45, the cords 40 are fed over a stationary cutter 50 (Figs. 4 and 6) which is supported on the platform 23 by a pair of brackets 51, 51. A horizontal guide member 52 is supported by a bracket 53, which is secured to the platform 23, and is shaped at one end to conform to and closely engage the periphery of the roller 45. The function of the member 52 is to guide the cords as they pass from the roller 45 over the cutter 50 to insure that they are in the proper position when cut. The guide member 52 is supported by a bracket 53 suitably secured to the cutter 50.

When cords of a predetermined length have passed the stationary cutter 50 they are cut by a revolving cutter 55 cooperating with a knife edge 56 formed on the stationary cutter 50. The revolving cutter 55 comprises a pair of diametrically opposed knives 57, 57, integral with a hub 58 (Figs. 6 and 8), and is actuated by a clock spring 60 and a clutch 61 through mechanism to be hereinafter described.

Positioned in alignment with the guide member 52 and suitably spaced therefrom is a tubular guide member 63 which is supported on the platform 23 by a bracket 64 (Fig. 4). Slidably supported on a guide rail 65 and in telescopic engagement with the guide member 63, is a channel shaped runway 66 which terminates in a semi-circular portion 67 (Fig. 1). The guide rail 65 is supported on and secured to the bench 20 by a plurality of upright standards 68.

As indicated in Fig. 15, the runway 66 comprises a pair of side members 69 and 70 which are integral with a base member 71. Revolvably mounted in suitable bearings formed in the side members 69 and 70 are a plurality of positively driven rollers 72, 72 (Fig. 1) which serve to push the cords along the runway 66. Removably mounted in the runway 66 between two successive rollers 72 is an electrical contact unit 75 (Figs. 1 and 11), the function of which will hereinafter be described. Covering the remainder of the runway 66 in the spaces between the rollers 72 are a plurality of removable covers 76, 76, either of which may be replaced by an electrical contact unit 75.

The contact unit 75 (Fig. 11) is inclosed within a housing 77 and comprises a pair of contact springs 78 and 79 which engage opposite sides of a vertically disposed reciprocable plunger 80. Pivotally mounted at 81 in a bifurcated portion 82 of the housing 77 is an angular member 83 (Fig. 11). The member 83 comprises two outwardly projecting arms 84 and 85 which are rigidly connected to or integral with each other at their pivot point 81. The free end of the arm 84 is pivoted at 86 to the lower end of the plunger 80 and the free end of the arm 85 normally rests on the runway 66 in the path of the moving cords 40. A leaf spring 87, suitably secured to the housing base 82, tends to urge the member 83 downwardly to insure that the arm 85 normally engages the surface of the runway 66.

Referring to Fig. 11, it is apparent that the contact springs 78 and 79 are normally insulated from each other, since their contact points 88 and 89 are separated by an insulated portion 90 at the tip of the plunger 80. However, it will be noted that as soon as the moving strands 40 come in contact with the arm 85, the member 83 will be displaced on its pivot 81, causing the arm 84, together with the plunger 80, to move upwardly. As the plunger 80 moves upwardly, a metal portion 92 thereof comes in contact with the points 88 and 89 of the contact springs 78 and 79, causing an electrical connection therebetween which serves to close an electrical circuit 95 (Fig. 12), the purpose of which will hereinafter be described. A sleeve 96 of any suitable insulating material, preferably hard rubber, is loosely mounted on the plunger 80 and is provided with a circular recess 97 whereby it rides loosely over a collar 98 secured to the plunger 80. The collar 98 normally engages the top of the recess 97 so that the plunger 80, when moving upwardly, carries with it the rubber sleeve 96. Upon the plunger 80 reaching its uppermost position, a reduced portion 99 of the sleeve 96 moves between the contact points 88 and 89, thereby breaking the electrical connection between the members 78 and 79 and re-opening the circuit 95 (Fig. 12).

From the above description it is apparent that the circuit 95 is closed only momentarily, which closure, however, is sufficient to energize a relay 100 causing it to attract its armature 101, thereby closing one of two electrical circuits 102 and 103 (Fig. 12). The circuits 102 and 103 are closed alternately by the relay 100 through mechanism to be presently described.

Electromagnets 105 and 106 are electrically connected in the circuits 102 and 103, respectively, and are suitably supported on the platform 23 with their cores opposite each other, by brackets 107 and 108 (Figs. 4 and 12). Positioned between and adapted to be attracted by either of the electromagnets 105 and 106 is an armature 110, the lower end of which is pivoted at 111 to brackets 112, 112 which are suitably secured to the top of the platform 23 (Fig. 4). The upper end of the armature 110 is bifurcated and is pivotally connected at 113 to one end of a horizontal link 114 whose other end is pivotally connected at 115 to one end of a second link 116. The opposite end of the link 116 is connected at 117 to a bifurcated member 118 which straddles the clutch 61. The member 118 is secured to a movable member 120 of a clutch 61 by pins 121, 121. The link 116 is pivoted near its center to a bracket 122, which is suitably secured to the platform 23.

Pivoted at 124 to a bracket 125 supported on the platform 23 and electrically connected in the circuits 102 and 103 is a lever member 126, one end of which is loosely held between a pair of pins 127, 127 secured to the link 114. The other end of the member 126 is adapted to engage either of two adjustable electrical contact members 128 and 129 connected in the circuits 102 and 103, respectively.

Referring to Figs. 4 and 12, it will be noted that by the last operation of the relay 100, the circuit 103 was closed and the electromagnet 106 energized and thereby caused to attract the armature 110. Also, through the movement of the armature 110 and the associated link 114, the member 126 was disengaged from the contact member 129 and caused to engage the contact member 128. Referring to Fig. 12 it is apparent that the next operation of the relay 100 will close the circuit 102, thereby energizing the electromagnet 105, causing it to attract the armature 110. The alternate attraction of the armature 110 by the electromagnets 105 and 106 causes a reciprocating movement of the link 114 which is transmitted through the link 116 and the member 118 to the movable member 120 of the clutch 61. Upon each longitudinal movement of the clutch member 120 the cutter 55 is revolved 180° through mechanism hereinafter described.

Referring to Figs. 8, 9, and 10 it will be noted that the clutch member 120 is loosely mounted on a sleeve 130, which sleeve is the stationary member of the clutch 61. The sleeve 130 is revolvably mounted on a shaft 132, which is rotatably journaled in bearings 131, 131, and has formed on its periphery four teeth-like projections 133, 134, 135, and 136, two of which, 133 and 134, are diametrically opposed to the other two, 135 and 136, and staggered longitudinally of the sleeve with respect to them. A recessed portion 137 of the clutch member 120 surrounds these teeth and is provided on its inner surface with a plurality of similar teeth 138, 139, 140, 141, and 142, the teeth 138 and 139 being diametrically opposed to the teeth 140, 141, and 142 and staggered with respect to them.

Formed integrally with the clutch member 130 is an annular disk member 145 to which is secured the revolving cutter 55. The outer end of the spiral spring 60 is fastened to the member 145 by a pin 146 and its inner end is fastened to a housing 147 inclosing the spring 60 and loosely mounted on the shaft 132.

The stored energy in the spring 60 constantly tends to revolve the clutch member 130, together with the cutter 55 in the direction indicated by the arrows in Figs. 6 and 9. This tendency is overcome, when the clutch member 120 is in the position wherein it is shown in Figs. 8 and 10, by the teeth 133, 134, 135, and 136 of the clutch member 130 engaging the teeth 138, 139, 141, and 142, respectively, of the clutch member 120. However, when the clutch member 120 is moved outwardly through the mechanism hereinbefore described, the teeth 133 and 134 will disengage the teeth 138 and 139 and pass through slots or openings 149 and 150 formed on either side of the tooth 133, and the teeth 135 and 136 will disengage the teeth 141 and 142 and pass through slots or openings 151 and 152 formed on either side of the tooth 141. The cutter 55, actuated by the spring 60, is now free to revolve 180°, after which the clutch 61 automatically re-locks itself through the teeth 133, 134, 135, and 136 of the clutch member 130 engaging the teeth 140, 141, 138, and 139, respectively, of the clutch member 120.

From the above description, it is apparent that upon the actuation of the contact member 75 by the ends of the moving strands, the cutter 55 is actuated almost instantaneously through the clutch 61 and the spring 60. The length of the severed strands is therefore determined by the distance, along the runway 66, between the arm 85 of the contact member 75 and the knife edge 56 of the stationary cutter 50. The side of the runway 66 is graduated (Fig. 1) to assist the operator in determining the proper location for the contact member 75 for strands which are required to measure a predetermined number of feet in length. In order to vary the distance between the contact member 75 and the cutter 50 an amount less than twelve inches, the runway 66 is movable along the guide rail 65 towards and away from the cutter 50 by means of a knob 155 formed at the end of a shaft 156. The shaft 156 is rotatably journaled in suitable bearings formed in the runway 66 and has secured thereto a pinion 157 adapted to engage a rack 158 formed at the bottom of the runway 66. The side of the guide rail 65 is graduated in inches so that the operator may readily determine the proper distance to move the runway 66 by an indicating pointer 159 secured to the side thereof.

The mechanism for restoring in the spring 60 the energy dissipated during each operation of the cutter 55 will now be described. Secured to the shaft 25 between the bearings 26 and 27 is a worm 160 which drives a worm gear 161 keyed at the end of the shaft 132 (Fig. 3.) Secured to the shaft 132 is a ratchet 163 against the teeth of which ride a pair of diametrically opposed pawls 164, 164 (Fig. 7). Loosely mounted on the shaft 132 between the ratchet 163 and the housing 147 is a second ratchet 165 which is slightly larger than the ratchet 163 (Fig. 8). A pair of diametrically opposed lugs 167, 167 are formed on the housing 147 on the side adjacent to the ratchet 165, which lugs project into diametrically opposed arcuate slots 168, 168 formed in the face of said ratchet. Interposed between each lug 167 and one end of the associated slot 168 is a compression spring 170 which urges the lug 167 to the opposite end of the slot, as best shown in Fig. 7. Each of the pawls 164 is secured at one end of a pin 171 which projects through an aperture in the ratchet 165. The opposite end of the pin 171 is secured to one end of member 173 which is pivoted at its other end 174 on a pin 175 projecting from the face of the housing 147. The end 174 of the member 173 is movable in a slot 175 formed in the face of the ratchet 165. Referring to Figs. 7 and 8, it is apparent that the spring 60, when wound, tends to rotate the housing 147 and ratchet 165 in a counter-clockwise direction. This is prevented by a pawl 177 suitably secured to the platform 23 and engaging the teeth of the ratchet 165.

During the operation of the apparatus, the shaft 132 together with the ratchet 163 is constantly driven from the shaft 25 through the worm 160 and worm gear 161 as hereinbefore described. The ratchet 165, which is loosely mounted on the shaft 132 is rotatable with the ratchet 163 through the pawls 164 and pins 171. Through the lugs 167 and springs 170 the housing 147 is rendered rotatable with the ratchet 165. Referring to Figs. 7 and 8, it will be noted that the rotation of the housing 147 causes the clock spring 60 to be wound. Upon the tension of the spring 60 becoming greater than the tension of the springs 170, the housing 147 is held stationary against the urging effect of the springs 170. Further rotation of the ratchet 165 causes the members 173 to pivot on the pins 175 and move to the opposite sides of the slots 176, thereby releasing the pawls 164 from the ratchet 163 to stop rotation of the ratchet 165. Through the ratchet mechanism just described the tension of the spring 60 is maintained substantially constant. The rotatable cutter 55 and its associated mechanism are inclosed within a housing 178 which is suitably fastened to the top of the platform 23 (Figs. 1 and 2).

The rollers 72 tend to push the strands 40 along the runway 66 at a slightly faster rate of speed than the capstan 38, but are prevented in so doing before the strands are cut due to the retarding effect of the capstan which results in a certain amount of slippage by the rollers 72. After the strands are cut, this slippage is eliminated, thereby causing the severed strands to be moved at a faster rate of speed so that when their ends clear the arm 85 of the contact member 75, they will be separated a suitable distance from the forward ends of the oncoming strands in order to allow the contact member 75 to reassume its normal position.

Referring to Fig. 11 it will be noted that upon the ends of the severed strands clearing the arm 85, the spring 87 will cause the plunger 80 to move downwardly carrying with it the sleeve 96. Upon the sleeve 96 clearing the contact points 88 and 89, it will drop by its own weight until the upper end of the recess 97 engages the collar 98. The plunger 80 continues to move downwardly until the arm 85 engages the top of the runway 66, at which position the contact points 88 and 89 are separated by the insulated portion 90 of the plunger 80. It should be noted that during the downward movement of the plunger 80, the insulating sleeve 96 serves to prevent contact of the members 88 and 89 with the metal portion 92 of the plunger 80, thereby maintaining the circuit 95 open.

The rollers 72 are driven from a shaft 180 through sprockets 181, 181 and sprocket chains 182, 182 (Figs. 1 and 2). The shaft 180 is rotatably journaled in suitable bearings secured to the runway 66. A bevel gear 183 is secured at the end of the shaft 180 and meshes with a bevel gear 184 which is slidably keyed to a shaft 185 and is rotatably journaled in a bearing 187 secured to the runway 66. The shaft 185 is rotatably journaled in bearings 188 and 189 which are suitably secured to the bench 20 and is driven through bevel gears 190 and 191 from a stud shaft 192 rotatably journaled in a bearing 193. The shaft 192, in turn, is driven from the main shaft 25 by sprockets 194 and 195 secured to the shafts 25 and 192, respectively, through a sprocket chain 196 (Fig. 3).

The semi-circular portion 67 of the runway 66 terminates at one end of a continuously moving belt 200 which extends approximately the entire length of the machine (Fig. 1). The belt 200 is driven over a pair of pulleys 201 and 202 which are secured to shafts 203 and 204 rotatably journaled in bearings 205 and 206, respectively, suitably supported on the underside of the bench 20. The shaft 204 is constantly driven through suitable gearing 207 from any suitable source of power (not shown). The upper span 208 of the belt 200 is slidably supported on the upper lip of a horizontal trough or container 209 which is mounted underneath the bench 20 by a plurality of brackets 210, 210 (Fig. 5).

Positioned immediately above the belt 200 and mounted on a horizontal shaft 211 is a hollow drum 212 which is provided with a plurality of radially projecting members 213, 213, as best shown in Fig. 5. The shaft 211 is rotatably journaled in bearings 214 and 215 secured to the bench 20 and is driven through suitable gearing (not shown) connected to a shaft 216. The shaft 216 is driven from the shaft 33 through a pair of sprockets 217 and 218 and a sprocket chain 219.

The members 213 of the drum 212 are adapted to engage the surface of the belt 210, as clearly shown in Fig. 5. It is apparent, therefore, that by indexing the drum 212 in the direction indicated by the arrow in Fig. 5, the strands carried on the surface of the belt 200 are ejected therefrom and collected in the container 209. The mechanism for indexing the drum 212 is shown diagrammatically at 220 in Fig. 1, and since it is similar to the mechansm employed for actuating the cutter 55, it is thought that a further illustration and description thereof is unnecessary. The drum 212 is normally held stationary against the action of the mechanism 220 by means of a pawl 221 engaging the teeth of a ratchet 222 mounted at the end of the shaft 211.

The mechanism for releasing the pawl 221 to index the drum 212 will now be described. The pawl 221 is formed at one end of a lever 223 which is pivoted at 224 to the bearing 214. Carried at the opposite end of the lever 223 is an armature 225 which is adapted to be attracted by an electromagnet 226 (Figs. 5 and 14). The electromagnet 226 is connected in an electric circuit 230 (Fig. 14) which is controlled by an electrical contact member 231 (Figs. 13 and 14), positioned at the end of the semicircular portion 67 of the runway 66.

The electrical contact member 231 is inclosed within a housing 232 and comprises a pair of contact springs 233 and 234 which engage opposite sides of a vertically disposed reciprocable plunger 235. Pivotally mounted at 236 in a bifurcated portion 237 of the housing 232 is an angular member 238 (Fig. 13). The member 238 comprises two outwardly projecting arms 239 and 240 which are rigidly connected to or formed integral with each other at their pivot point 236. The free end of the arm 239 is pivoted at 241 to the upper end of the plunger 235, and the free end of the arm 240 normally rests on the surface of the belt 200. A spring 242, which is fastened at one end to the housing base 237 and secured at its other end to the arm 239, tends to urge the member 238 downwardly, to insure that the arm 240 will normally engage the surface of the moving belt.

Referring to Fig. 13, it will be noted that the contact springs 233 and 234 are normally insulated from each other since their contact points 243 and 244 are separated by an insulated portion 245 at the lower end of the plunger 235. However, it will be noted that as soon as the moving strands 40 clear the arm 240, the spring 242 will cause the member 238 to be displaced on its pivot point 236, causing the arm 239, together with the plunger 235, to move downwardly. As the plunger 235 moves downwardly, a metal portion 246 thereof comes in contact with the points 243 and 244 of the contact springs 233 and 234, respectively, establishing an electrical connection therebetween, which operates to close an electrical circuit 250 (Fig. 14) in which is connected a relay 251. The circuit 250, when closed, causes the relay 251 to be energized, thereby attracting an armature 252 which operates to close the circuit 230. It should be noted that the circuit 250 is closed only momentarily, since, during the continued downward motion of the plunger 235, an insulating sleeve 255, slidably mounted thereon, moves between the contact points 243 and 244, thereby reopening the circuit 250. The sleeve 255 also serves to prevent closure of the circuit 250 during the upward movement of the plunger 235.

The electromagnet 226, when energized, is adapted to attract the armature 225 whereby the pawl 221 is disengaged from the ratchet 222, thereby permitting the drum 212 to be indexed, causing the severed strands 40 to be ejected from the belt 200 into the container 209. Any suitable means may be provided for collecting the strands in the container 209 and tying them in bunches of any convenient size. In the present embodiment of the invention, the container is provided with a plurality of slots 258 which are adapted to retain suitable strands for tying the severed strands when a predetermined number have been collected.

What is claimed is:

1. In an apparatus for severing a strand into predetermined lengths, a runway, means for moving the strand along said runway, a rotatable severing mechanism, resilient means actuated by the moving strand for operating the severing mechanism, and means for restoring in said resilient means the energy dissipated during each operation of the severing mechanism.

2. In an apparatus for severing a strand into predetermined lengths, a spring operated severing mechanism, means for restoring in said severing mechanism the energy dissipated during each actuation thereof, means for ejecting the severed strands and means actuated by the severed strands for operating said ejecting means.

3. In an apparatus for severing a strand into predetermined lengths, a runway, a severing mechanism, means for moving the severed strands along said runway, means for ejecting the severed strands, an electric circuit including a source of current and means for operating said ejecting means, and mechanism actuated by the severed strands for controlling said circuit.

4. In an apparatus for simultaneously severing a plurality of moving strands into predetermined lengths, a runway, a plurality of rollers for moving the strands along said runway, a spring operated severing mechanism, means actuated by the moving strands for actuating said severing mechanism, means for ejecting the severed strands from said runway, mechanism actuated by the severed strands for operating said ejecting means, and mechanism for collecting the ejected strands.

5. In an apparatus for severing a strand into predetermined lengths, a runway, a plurality of rollers for moving the strand along said runway, a spring actuated cutting mechanism, an electric circuit including a source of current and means for actuating said severing mechanism, mechanism actuated by the moving strand for controlling said circuit, means for ejecting the severed strands from said runway, an electric circuit including a source of current and means for actuating said ejecting means, and mechanism actuated by the severed strands for controlling said last-mentioned circuit.

6. In an apparatus for severing a strand into predetermined lengths, means for advancing a strand, a severing mechanism movable under spring tension to sever the strand, an electrical circuit including a source of current and means for controlling the operation of the severing mechanism, and means actuated by the strand for controlling said circuit.

7. In an apparatus for severing a strand into predetermined lengths, a runway, a plurality of rollers for advancing a strand along said runway, a severing mechanism movable under spring tension to sever the strand, means adjustably positioned along the runway and actuated by the advancing strand for controlling the operation of the severing mechanism, and means for restoring, in the severing mechanism, the energy dissipated during each actuation thereof.

8. In an apparatus for simultaneously severing a plurality of moving strands into predetermined lengths, a runway, means for advancing the strands along said runway, a severing mechanism movable under spring tension to sever the strands, means actuated by the moving strands for controlling the operation of the severing mechanism, and a continuously moving belt for advancing the severed strands.

9. In an apparatus for severing a strand into predetermined lengths, a strand severing mechanism, means for advancing a severed strand, means for collecting severed strands, and means actuated by an advancing severed strand for transferring said strand from the advancing means to the collecting means.

In witness whereof, I hereunto subscribe my name this 15th day of December A. D., 1924.

CARL ODENWALD HAASE.